United States Patent
Conchi et al.

(10) Patent No.: US 7,194,391 B2
(45) Date of Patent: Mar. 20, 2007

(54) METHOD AND SYSTEM FOR SEAT PLACEMENT

(75) Inventors: William R. Conchi, Kenmore, WA (US); Mark W. Talbert, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 573 days.

(21) Appl. No.: 10/676,870

(22) Filed: Sep. 30, 2003

(65) Prior Publication Data

US 2005/0071138 A1   Mar. 31, 2005

(51) Int. Cl.
*G06F 17/50* (2006.01)
*G06F 3/00* (2006.01)

(52) U.S. Cl. .................... 703/2; 703/1; 703/8; 702/179
(58) Field of Classification Search ............. 703/1, 703/2, 5, 8; 701/45; 244/118.6; 280/728.1; 434/55; 702/179; 345/650–653
See application file for complete search history.

(56) References Cited

U.S. PATENT DOCUMENTS

| | | | |
|---|---|---|---|
| 5,160,771 A | 11/1992 | Lambing et al. | |
| 5,578,384 A | 11/1996 | Kingston | |
| 5,611,503 A | 3/1997 | Brauer | |
| 5,636,424 A * | 6/1997 | Singer et al. | 29/407.01 |
| 5,693,157 A | 12/1997 | Kingston | |
| 5,866,272 A | 2/1999 | Westre et al. | |
| 6,007,338 A * | 12/1999 | DiNunzio et al. | 434/55 |
| 6,039,832 A | 3/2000 | McCarville | |
| 6,113,500 A * | 9/2000 | Francis et al. | 472/60 |
| 6,113,644 A | 9/2000 | Weber et al. | |
| 6,114,050 A | 9/2000 | Westre et al. | |
| 6,132,108 A | 10/2000 | Kashiwamura et al. | |
| 6,194,081 B1 | 2/2001 | Kingston | |
| 6,320,118 B1 | 11/2001 | Pridham et al. | |
| 6,465,110 B1 | 10/2002 | Boss et al. | |
| 6,947,875 B2 * | 9/2005 | Winkler et al. | 703/1 |
| 2001/0005074 A1 * | 6/2001 | Sakai et al. | 280/728.1 |
| 2002/0026296 A1 | 2/2002 | Lohmann et al. | |
| 2002/0161563 A1 | 10/2002 | Elabiad et al. | |
| 2003/0018454 A1 | 1/2003 | Winkler et al. | |
| 2004/0010398 A1 | 1/2004 | Noma et al. | |
| 2004/0144288 A1 * | 7/2004 | Chiang | 108/1 |
| 2004/0232283 A1 * | 11/2004 | Ferry et al. | 244/118.6 |
| 2005/0055180 A1 * | 3/2005 | Pischke et al. | 703/1 |
| 2005/0131607 A1 * | 6/2005 | Breed | 701/45 |

* cited by examiner

*Primary Examiner*—Thai Phan
(74) *Attorney, Agent, or Firm*—Lee & Hayes, PLLC

(57) ABSTRACT

A method, computer program, and system for generating computer-based models of seats on a passenger compartment floor plate from a first document are provided. According to an exemplary embodiment of the invention, a first document defining a plurality of seat positions and seat identities associated with the seat positions is received. Dimensions according to seat identities are extracted. A model of the seats affixed with fasteners to the passenger compartment floor plate based upon the seat positions, the extracted dimensions, and seat identities is generated. Loads on the fasteners generated by subjecting the model to an acceleration of a known magnitude and direction are simulated and stored. Additionally, a load analysis for the seat configuration is generated demonstrating FAR compliance

30 Claims, 6 Drawing Sheets

| | | | Drawing Number | |
|---|---|---|---|---|
| 151 → | Airplane Model | | | |
| | Airline Customer | | | |
| | Effectivity | | | |
| | Line Number | | | |
| | Seat Supplier | Calculated Input | | |
| | Seat Class | Default Input | | |
| | Configuration | | | |
| | Seat Pitch | | | |
| | Number of Seat Models | | | |
| 154 → | Reference Drawings | | | |
| | Boeing LOPA | | XXXXXXX | Rev. X |
| | Seat Part Number and Color Distribution Drawing | | XXXXXXX | Rev. X |
| | Seat Basic Dimensions | | XXXXXXX | Rev. X |
| | Seat Envelope Drawing | | XXXXXXX: XXX | |
| | Reference Documents | | | |
| | D6-36230 Rev. K | | | |
| | D6-36238 Rev. C | | | |
| 157 → | Seat Basic Information | | | |
| | Seat Part Number | | | |
| | Seat Item Number | | | |
| | Number of Seat Places | | | |
| | Number of Legs (Posts) | | | |
| | Seat Type | | | |
| | Yaw Angle (Degrees) | | | |
| | 0 To Leg 1 (BL) | | | |
| | Leg 1 BL | | | |
| | Leg 2 BL | | | |
| | Leg 3 BL | | | |
| | Leg 4 BL | | | |
| | Station Data | | | |
| 161 → | Seat Basic Dimensions | | | |
| | SRP | | | |
| | SRPH | | | |
| | TAR | | | |
| | q1 | | | |
| | q2 | | | |
| | q3 | | | |
| | q4 | | | |
| | q5 | | | |
| | q6 | | | |
| | r1 | | | |
| | r2 | | | |
| | r3 | | | |
| | r4 | | | |
| | r5 | | | |
| | USC | | | |
| | Pan Height (747 only) | | | |
| | STS Leg 1 | | | |
| | STS Leg 2 | | | |
| | STS Leg 3 | | | |
| | Rubstrip Width | | | |
| | Total Seat Width | | | |
| 164 → | C.G. Location | | | |
| | Seat CGx | | | |
| | Cgz | | | |
| | Data Part Number | | | |
| | Stud (P/V) | | | |
| | 's 1 | | | |

METHOD AND SYSTEM FOR SEAT PLACEMENT

RELATED APPLICATIONS

This application incorporates application Ser. No. 10/657,553, filed on Sep. 8, 2003, by this reference.

FIELD OF THE INVENTION

This invention relates generally to computer assisted modeling and, more specifically, to computer assisted modeling of aircraft.

BACKGROUND OF THE INVENTION

When an airline customer orders a commercial aircraft from a manufacturer, many details are generally customized for the ordering customer. These details include the layout of the passenger compartment. Generally known as the "layout of passenger accommodations" ("LOPA"), the placement of seats, bulkheads, galleys, and lavatories vary from customer to customer in accord with the customer's corporate identity. One customer or commercial carrier may choose to emphasize the amount of leg room offered in coach class while another may choose to add a row of seats and gain efficiencies in terms of numbers of passengers per flight.

The LOPA is part of the order and is generally accommodated by the manufacturer. The customer or commercial carrier will designate a seat manufacturer and model line. The LOPA accompanying the order is drawn to include locations of various seats throughout the cabin. Thus, the LOPA becomes a part of the contract specification, requiring fulfillment in order to complete the order. Generally, the LOPA is provided to the manufacturer in the form of a plan view drawing, either in paper or in electronic form. Alternatively, the LOPA could exist as a database filled with numbers descriptive of precise seat anchoring locations and the seat parts anchored thereto. By either means, the customer's desires as to the precise seat placement are communicated to the manufacturer with the intent that the manufacturer build out the passenger cabin appropriately.

The FAA has directives that require that a passenger seat be designed to carry a designated weight through a designated acceleration along a number of designated axes without parting from or distorting the floor plate to which the seats are affixed. The regimen that has been traditionally used to solve the problem is to define each seat load and seat weight as a mass at a center of gravity on a lever arm exerting a force on fasteners affixing the seats to the floor plate. For a single engineer, the process requires the grouping of seats into units by seating capacity, size, attachment angle, etc.; calculating the response of the unit to acceleration; distributing the resultant force among the fasteners; cumulating the results for all of the units; compiling the results into a template; and verifying the results as sensible. The process currently requires between 180 and 250 hours to generate a compiled result.

There exists then, an unmet need in the art for an inexpensive and accurate way to calculate stresses on a floor plate resulting from the acceleration of passenger loads in seats placed according to a LOPA defining a passenger cabin.

SUMMARY OF THE INVENTION

A method, computer program, and system for generating computer-based models of seats on a passenger compartment floor plate from a first document are provided. According to an exemplary embodiment of the invention, a first document defining a plurality of seat positions and seat identities associated with the seat positions is received. Dimensions according to seat identities are extracted. A model of the seats affixed with fasteners to the passenger cabin floor plate based upon the seat positions, the extracted dimensions, and seat identities is generated. Loads on the fasteners generated by subjecting the model to an acceleration of a known magnitude and direction are simulated and stored. Additionally, a load analysis for the seat configuration is generated demonstrating FAR compliance Likewise, embodiments of the invention obviate the need for individual manual modeling of seat units in the passenger cabin for acceleration testing. A Floor Stress Group can confidently assure compliance with FAA directives as to seat placement in spite of varied arrangements dictated by airplane purchasers.

As a result, embodiments of the invention allow a high-degree of competence in seat placement without requiring extensive engineering or material experience. According to a presently preferred embodiment, a layout for interior configuration is received and critical dimensions are extracted from the interior configuration for the placement of seats. Seat dimensions for each of the several seat part numbers augment the extracted critical dimensions from the interior configurations. Analyzing seats to levers and masses at an appropriate location within the configuration enables generation of a three-dimensional stress model for a load analysis. Thus, the seat configuration is generated and analyzed to demonstrate compliance with Federal Aviation Regulations (FAR).

BRIEF DESCRIPTION OF THE DRAWINGS

The preferred and alternative embodiments of the present invention are described in detail below with reference to the following drawings.

FIG. 6 is an excerpt of an input spreadsheet.

DETAILED DESCRIPTION OF THE INVENTION

By way of overview, a method, computer program, and system for generating computer-based models of seats on a passenger compartment floor plate from a first document are provided. According to an exemplary embodiment of the invention, a first document defining a plurality of seat positions and seat identities associated with the seat positions is received. Dimensions according to seat identities are extracted. A model of the seats affixed with fasteners to the passenger cabin floor plate based upon the seat positions, the extracted dimensions, and seat identities is generated. Loads on the fasteners generated by subjecting the model to an acceleration of a known magnitude and direction are simulated and stored. Additionally, a load analysis for the seat configuration is generated demonstrating FAR compliance. It will be appreciated that a suitable host environment for the present invention may also be practiced in distributed computing environments where tasks are performed by remote processing devices that are linked through a communications network. In a distributed computing environment, program modules may be located in both local and remote memory storage devices. Execution of the program modules may occur locally in a stand-alone manner or remotely in a client/server manner. Examples of such distributed computing environments include local area networks of an office, enterprise-wide computer networks, and the Internet.

Figure 1:
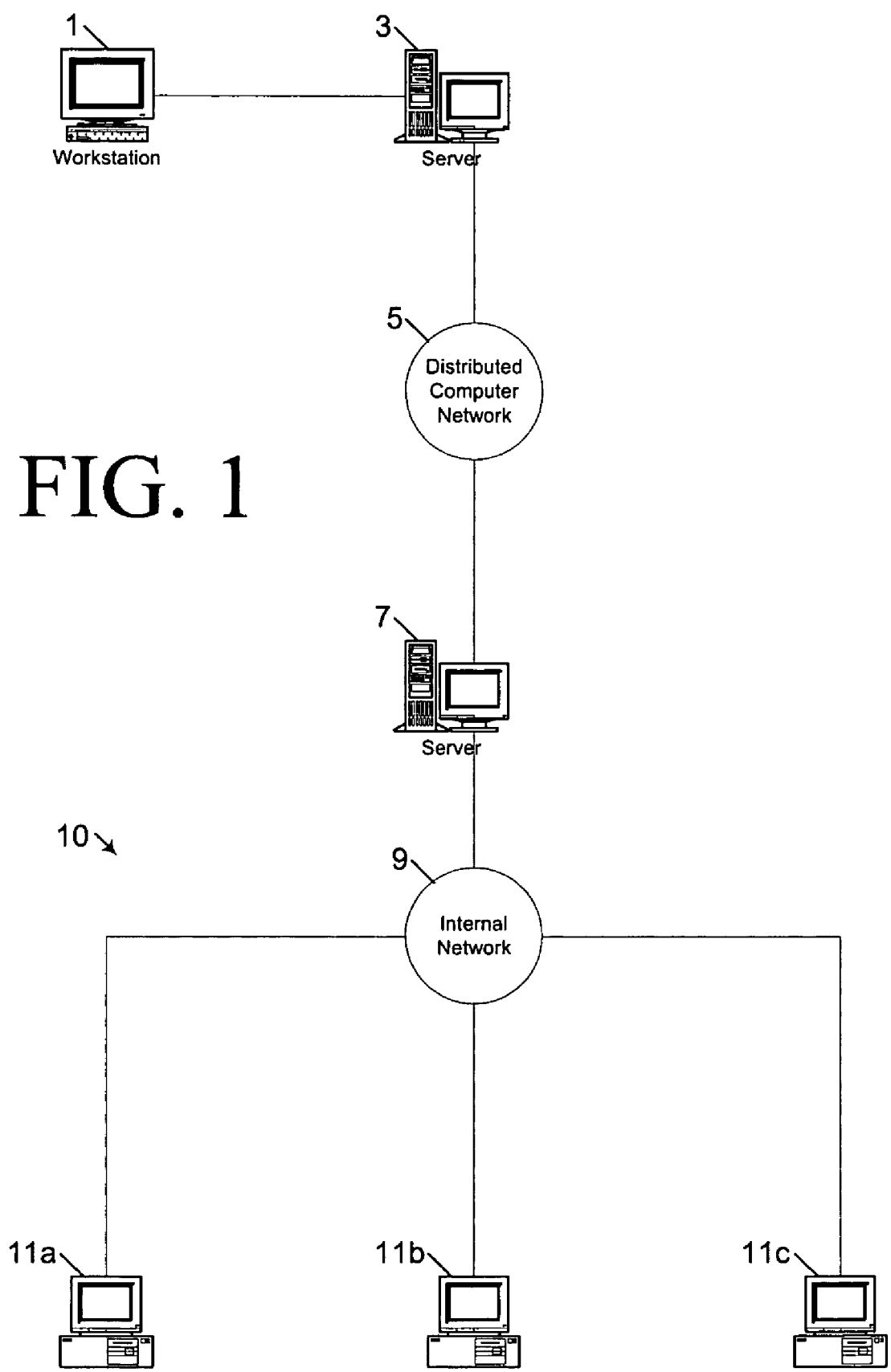
FIG. 1 shows an exemplary network for hosting the invention.

FIG. 1 shows an exemplary network for hosting the invention. FIG. 1 illustrates a typical client-server environment 10 in which an exemplary embodiment of the present invention operates. A computer system or client 1, such as a conventional personal computer or any device operable to communicate over a network, is connected to an Internet server computer 3 ("server"). The server 3 is generally provided by an Internet service provider (ISP), which provides Internet access for a typical Internet user. The server 3 is connected to a distributed computer network 5, such as the Internet or a wide-area network ("WAN"), and enables the client 1 to communicate via the distributed computer network 5.

The client 1 communicates via the combination of the server 3 and the distributed computer network 5 to a server 7, such as a communication or an e-mail server. In an exemplary embodiment, servers 3 and 7 support e-mail services, contain a message store for holding messages until delivery, and contain a translation facility or gateway for allowing users having different e-mail programs to exchange mail. The server 7 is connected to an internal network 9, such as a local-area network ("LAN") and enables the client 1 to communicate with the clients 11a, 11b, and 11c via the internal network 9.

The clients 11a, 11b, and 11c are not only able to respond to a communication from the client 1, but are also able to initiate communication with the client 1. The clients 11a, 11b, and 11c can send information via the internal network 9 to the server 7. The server 7, in turn, forwards the information to the client 1 via the distributed computer network 5. The information is retrieved by the server 3 and can be forwarded to the client 1, when requested by the client 1.

Figure 2:
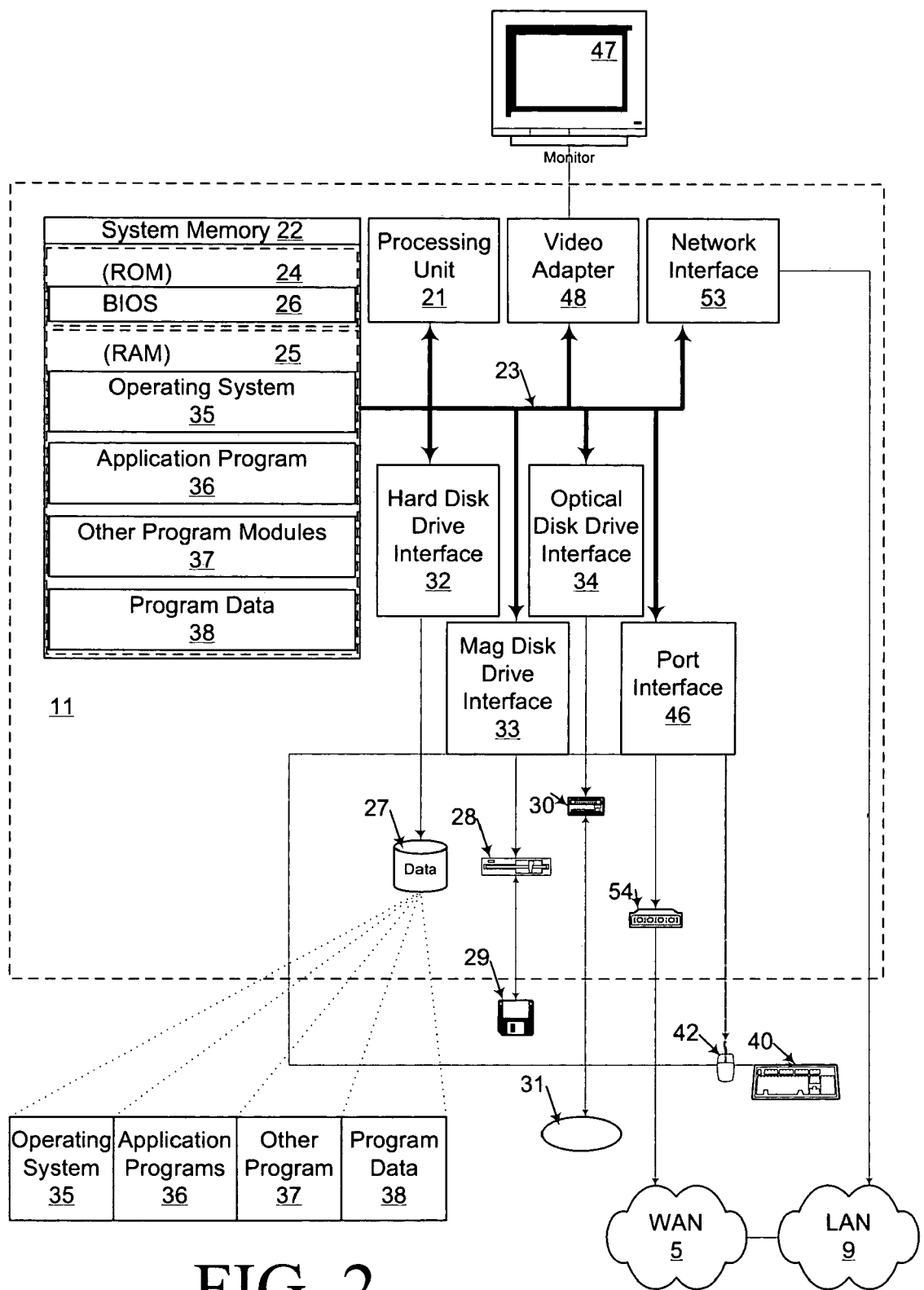
FIG. 2 shows an exemplary client computer on the network displayed in FIG. 1.

FIG. 2 shows an exemplary client computer on the network displayed in FIG. 1. With reference to FIG. 2, an exemplary system for implementing the invention includes a conventional personal computer 11, which serves as a client. The client 11 may represent any or all of the clients 1, 11a, 11b, and 11c illustrated in FIG. 1. The client 11 includes a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the client 11, such as during START-up, is stored in ROM 24. The client 11 further includes a hard disk drive 27, a magnetic disk drive 28, e.g., to read from or write to a removable disk 29, and an optical disk drive 30, e.g., for reading a CD-ROM disk 31 or to read from or write to other media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the client 11. Although the description of computer-readable media above refers to a hard disk, a removable magnetic disk and a CD-ROM disk, it will be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs, such as an e-mail program module 36, other program modules, such as a message manager program module 37, a local message store 38, and a database for supporting e-mail applications. A user may enter commands and information into the client 11 through a keyboard 40 and pointing device, such as a mouse 42. Other input devices (not shown) may include a pen, touch-operated device, microphone, joystick, game pad, satellite dish, scanner, or the like. These and other input devices are often connected to the processing unit 21 through a port interface 46 that is coupled to the system bus, but may be connected by other interfaces, such as a serial port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The client 11 operates typically in a networked environment using logical connections to one or more remote computers, such as a remote computer 49. The remote computer 49 may be an e-mail server (which includes one or more message stores), as described above in connection with FIG. 1, a file server (which includes one or more file stores), a router, a peer device or other common network node, and typically includes many or all of the elements described relative to the client 11. The logical connections depicted in FIG. 2 include the local area network (LAN) or the wide area network (WAN) 5. Such networking environments are commonplace in offices, enterprise-wide computer networks, intranets and the Internet.

When used in a LAN networking environment, the client 11 is connected to the LAN 9 through a network interface 53 or additionally through the WAN 5. When used in a WAN networking environment, the client 11 typically includes a modem 54 or other means for establishing communications over the WAN 5, such as the Internet. The modem 54, which may be internal or external, is connected to the system bus 23 via the serial port interface 46. In a networked environment, program modules depicted relative to the client 11, or portions thereof, may be stored in the remote memory storage device. It will be appreciated that the network connections shown are exemplary and other means of establishing a communications link between the computers may be used.

Figure 3:
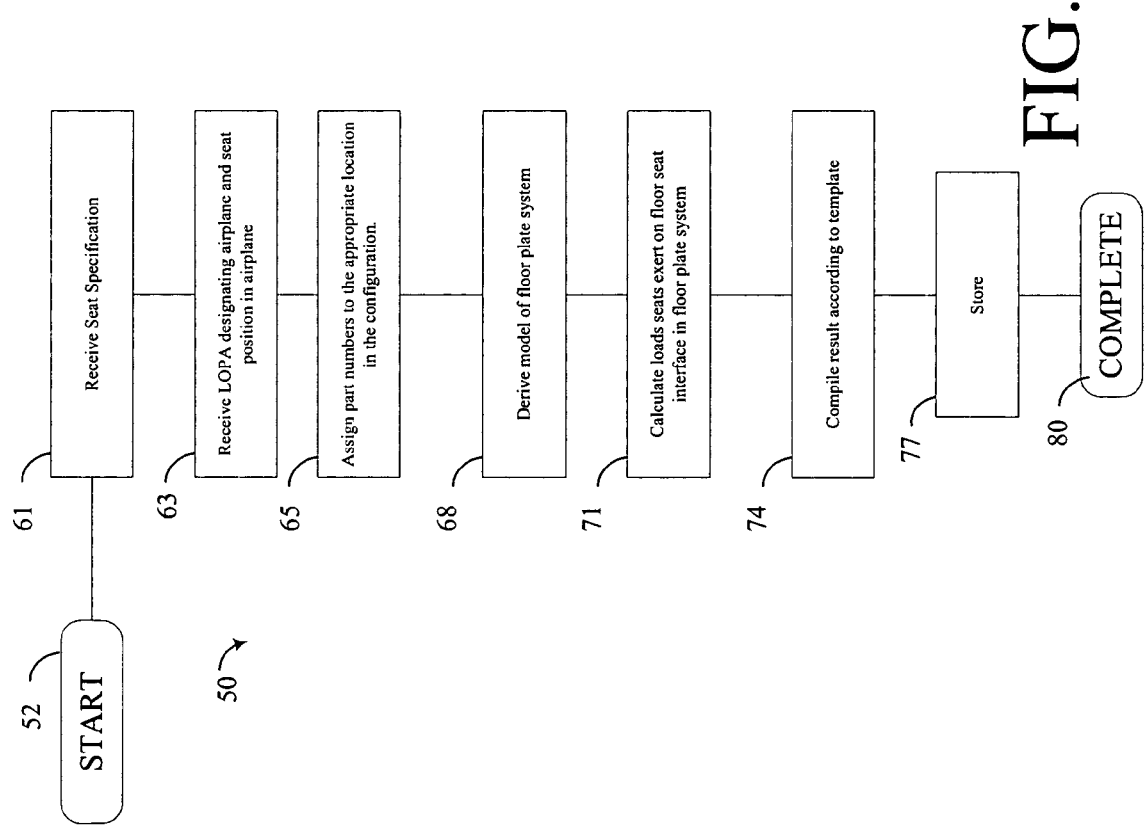
FIG. 3 is a flowchart setting forth an embodiment of a method of the present invention.

FIG. 3 is a flowchart setting forth an embodiment of a method of the present invention. Referring now to FIG. 3, a routine 50 according to an exemplary embodiment of the present invention starts at a block 52. At a block 61, a customer order includes an interior configuration known as a lay out of passenger accommodations or LOPA. The LOPA is a plan view or two-dimensioned layout of personal appointments within the passenger cabin. Within a particular LOPA, it is common to have as many as 30 distinct seat part numbers with 15 to 18 part numbers dedicated to the coach compartment. Each of the part numbers may differ in one detail or another in order to accommodate placement within the cabin. Nonetheless, within the cabin, all of the seats suitably have coordinated upholstery, giving the passenger cabin the feel of a unified hull.

Such appointments suitably include placement of lavatories, galleys, bulkheads, and, specifically, seats. The floor decking shown within the passenger cabin as laid out includes a number of tracks for fixing seat to the decking. While the placement of these tracks may be custom ordered, more often customers will utilize tracks in standardized positions. Seating manufacturers are aware of the placement of the tracks in the standardized configuration and manufacture seating according to the placement of the tracks. It is for this reason that the LOPA will often place seating units simply by reciting a part number, station number and general location side-to-side, i.e., center or outboard. A station number represents a precise measurement of the seats positioned aft of the nose of the aircraft. The outline of the seat determines which of the seat tracks are involved.

The LOPA is generally represented in a two-dimensional drawing in CATIA format. CATIA is an advanced computer-assisted modeling program often used for computer modeling of parts for production. Complex assemblies can be readily represented in a three-dimensioned computer generated space by means of CATIA coordinates. Other suitable modeling program formats include Unigraphix, AutoCAD, or any of a number of other such computer assisted drawing programs. XML is a standard data format used for text files and information in computer memory that allows easy data processing and exchange between different applications. Indeed, the LOPA may be either a spreadsheet containing specific part numbers anchored at specific locations or an XML document indicating the same information.

From the CATIA representation, or any other suitable representation such as a spreadsheet, the computer extracts defining dimensions at a block 63. In one presently preferred embodiment, a computer program capable of interpreting CATIA, such as without limitation ICAD, can be programmed to perform the extraction. ICAD is not required, however. Any program capable to suitably extract dimensions from the LOPA will appropriately supply the information software component at a block 65.

Once the part numbers, and locations are extracted, at a block 68, the dimensions are stored in association with the part numbers. The critical dimensions corresponding to each part number are received from the seat manufacturer. The critical dimensions define the action of the seat as a lever against the floor plate under acceleration.

In a presently preferred embodiment, a Visual Basic-enabled interface driving an Excel spreadsheet uses a graphic representation of the space approximating the layout of the space with seat templates to generate the model of a floor plate system. This graphic representation presents the critical dimensions in a "human-readable" form and allows critical dimensions of each seat to be entered and read according to its part number.

Another presently preferred embodiment is to construct an XML document model by means including by means of an Active Server Page (ASP). An ASP is suitably an uncompiled program that includes one or more sets of code that are processed on a server before the page is sent to the user and is a feature of the Microsoft Internet Information Server (IIS). However, because the server-side script is just building a regular HTML page on the server then feeding it to the web browser, the resulting display can be delivered to almost any browser. While use of an ASP is a presently preferred method, the functionality of a page might be accomplished by including a script written in JAVA or JScript in an HTML file or by using ActiveX Data Objects ("ADOs") program statements in the HTML file.

A presently preferred embodiment includes use of the server-side ASP rather than a client-side script, where either might work, because the server-side script will result in an easily displayable HTML page. It will be appreciated that client-side scripts (for example, with JavaScript) may not work as intended on older browsers or may result in performance degradation for loading the page. Sever-side script allows for greater control of variables in hardware or resident software that might otherwise affect the display of data stored on the network.

By any enabled means, the associating of each a seat identity with a precise location allows each of the critical dimensions to then be used to define a mass and lever arm of suitable length and moment of force. Thus, in a rapid manner, the data generates a localized model of the seat for inclusion in a larger model of the floor plate system. In the preferred embodiment, the model is stored in at least one file describing the floor plate system including all of the ordered seats as a model comprising each of the seat units as a lever system.

At a block 71, the data to produce the localized model of the seat is applied to a set of rules for completing the seat definition and datasets. The Federal Aviation Administration currently requires that each seating unit be able to bear certain loads including a 9-G load. In order to satisfy that requirement, the model, as stored, is mathematically subjected to the loads the occupied seat units exert, under all loading conditions required by the FAR, on fasteners affixed to the decking are calculated. To this end, the acceleration is mathematically applied along every of the prescribed vectors. The results of each acceleration are compared to the ratings for the fasteners to assure compliance with the appropriate FAR. In this manner, the whole of the system is analyzed as a composite of the various seat units.

At a block 74, a results spreadsheet is generated according to a template. In a presently preferred embodiment, the template used to input the seat locations, part numbers and critical dimensions is the same template used to output the load calculations in association with the vectors representing acceleration along any of the several designated axes. As with the input spreadsheet, a presently preferred embodiment At a block 77, the results spreadsheet is stored at an addressable memory site for review or distribution according to the needs of the user. Having generated and stored the model and the results of acceleration, the method ends at a block 80.

Figure 4:
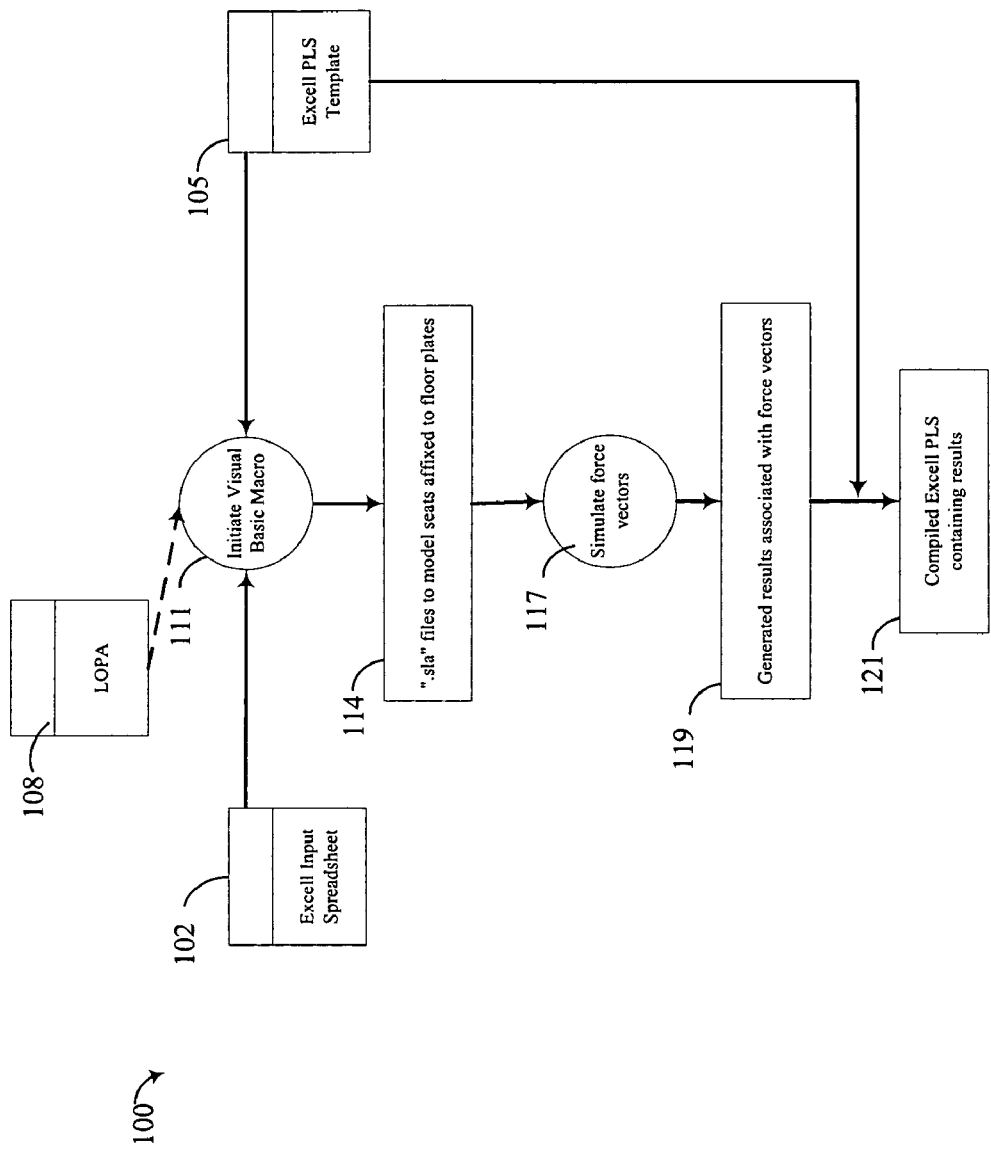
FIG. 4 is a logical chart showing input and selected outputs.

FIG. 4 is a logical chart showing input and selected outputs. Referring now to FIG. 4, a presently preferred data flow diagram 100 shows flows of data used to generate the floor plate system model. A system uses a specification of the floor plate, the locations of seats on the floor plate, and the identity of the seats in the locations to build a floor plate system model.

One presently preferred embodiment receives information used to build a floor plate system model from a spreadsheet 102 in Excel format. The spreadsheet 102 has within it the designation of the floor plate by model number, e.g. 777-300ER and the enumeration of seats along with associated locations on the floor plate and geometry. The enumeration of the seats includes the critical dimensions of the seats allowing the calculation of precise placement of the mass of the seat and load on the floor plate.

In a presently preferred embodiment, the input spreadsheet 102 is formulated according to a PLS template 105. It is advantageous to use the same spreadsheet template 105 for both input and output of the information as information will remain in a standardized position on the spreadsheet making the automated "picking" of information possible throughout the design process.

Another presently preferred embodiment receives the specification of the floor plate, the locations of seats on the floor plate, and the identity of the seats in an XML document.

(Extensible Markup Language).

Still another presently preferred embodiment allows for the receipt of an abbreviated spreadsheet 102 and access to the LOPA 108 from the customer order. The conventional format of a LOPA 108 is in CATIA modeling. A first software component 111 optionally extracts data from the CATIA model. Often, the first software component 111 may be programmed to report the extracted data in a spreadsheet 102 allowing the extracted data available both to the first software component 111 and for human review.

The spreadsheet 102, an XML document, or the spreadsheet 102 in conjunction with the LOPA 108 provide the first software component 111 (in one embodiment, a Visual Basic Macro) with sufficient information to generate a model of the floor plate system. The first software component 111 may refer to a load structure template 105 to determine to what are the appropriate calculations necessary to comply with applicable FARs for a particular airframe as designated in either the spreadsheet 102 or the LOPA 108.

The first software component 111 generates the model 114, in the presently preferred embodiment, in files with an extension ".sla." The resulting model 114 can be either stored as a single model 114 with all of the individual modeled seats or as a single composite model. As the single composite model 114 is more easily derived as a number of finite seat elements, a presently preferred embodiment allows the storage of the model 114 as a number of finite seat elements stored as individual ".sla" files.

A simulator component 117 acts upon the model 114 as stored in the ".sla" files. The simulator component 117 acts upon the model according to a regimen configured to comply with the FAR dictating the seat load requirements. Because the industry has developed various regimens useful for calculating of forces exerted by a load in a seat upon a fastener holding the seat, the forces exerted by the individual units are readily calculable.

The simulator component 117 calculates a force resulting from the acceleration of the seat and load in a direction. Because the acceleration has a magnitude and a direction, the acceleration is readily represented as a vector. The vectors to be tested are defined by FAR. The simulator will subject the mathematical model to the vector and will calculate loads the acceleration will generate on the fasteners holding the seat units to the floor plate system.

An associating component 119 will order the results with the vectors. Associating the loads generated with the direction of the acceleration allows greater insight into seat unit design and may suggest alternative configurations where loads generated by a seat unit exceed the capabilities of the fasteners.

The associated results are stored in a results spreadsheet 121 according to the spreadsheet template 105 at an addressable memory site. The results spreadsheet takes the results set forth according to the associated vectors and reports the generated loads for review by a Seat Load Review Group. The spreadsheet format has proven advantageous in a presently preferred embodiment. Alternate forms of reporting will achieve the object of the invention such as an XML results document.

Figure 5:
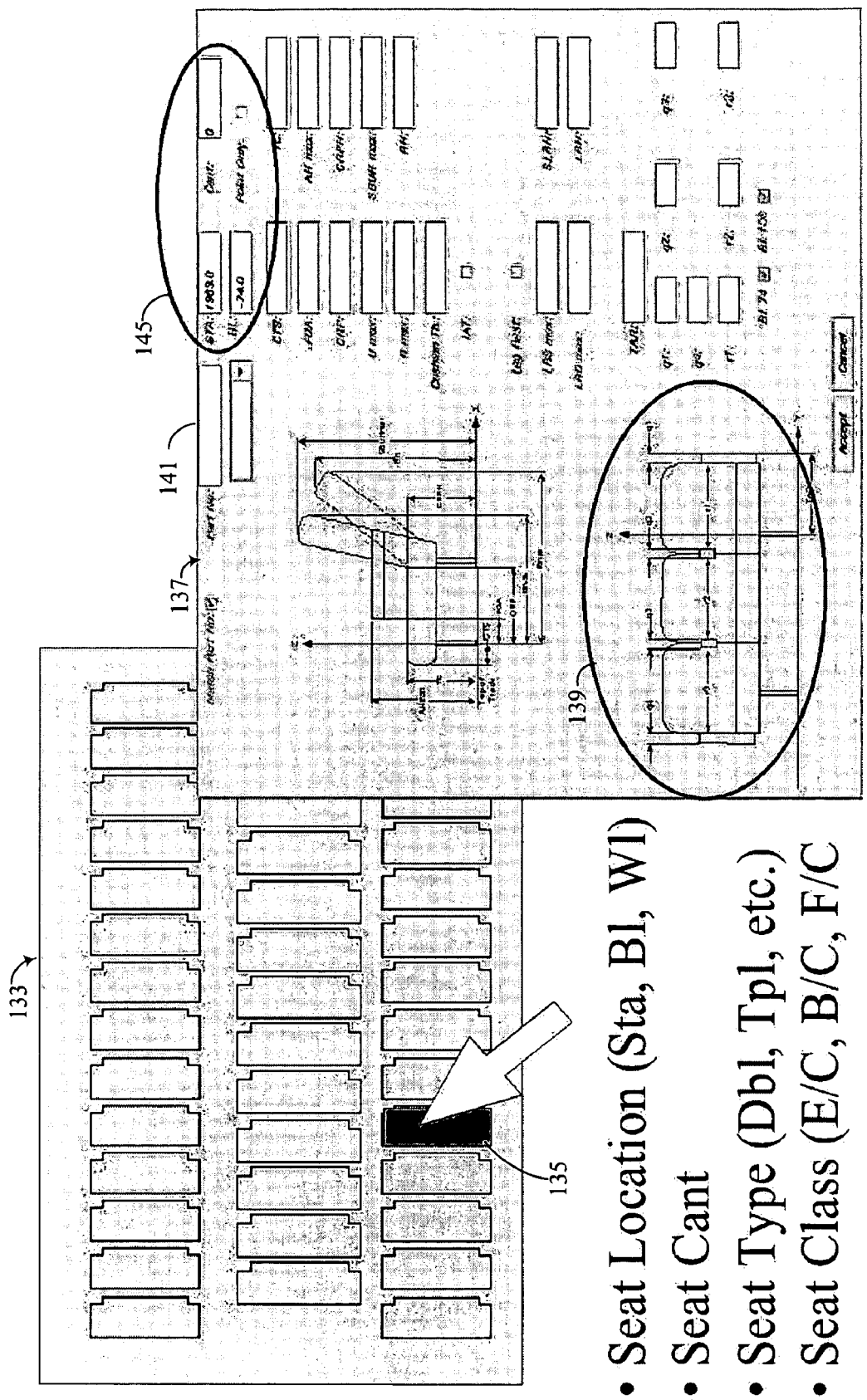
FIG. 5 is a diagram of a graphic representation of an extracted model and method for inputting seat geometry data.

Referring now to FIG. 5, a graphic template 133 for generating the input spreadsheet 102 (FIG. 4) is set forth. Based upon an extracted LOPA, the graphic template shows seat units 135 arranged to fill a designated floor plate according to the designated model of airplane. For each seat unit, a user may review the extracted data by "clicking" on it. The template refers to the extracted data to populate a seat unit template 137.

While the graphic template does not endeavor to exactly place the seats in the passenger space, the computer stores placement of the seats in series of data points indicated as the exact location 145 of the seat unit on the floor plate by station and offset. These data points are provided and are also variable by the user. Where the LOPA does not designate a particular part number or where, due to testing, the user chooses to change the part number associated with a particular seat unit, the field containing the part number 141 is user alterable. The user may then enter the part number 141 and, if the appropriate dimensions are stored on the computer, the computer will immediately automatically fill each of the dimensions from a catalog database. If the computer does not have a particular part number prestored, the user now may indicate each of the values appropriate in the boxes set forth. To assist the user and to prevent the introduction of errors, the computer generates a graphic representation 139 of the seat according to the part number. Where no catalog database exists, the template allows the user to enter the critical dimensions from other sources to complete the information necessary to generate the input spreadsheet 102 (FIG. 3).

The seat unit template 137 includes a graphic representation of a seat unit generalized according to a type. For instance where a row of seats may be a 3-4-3 configuration, a single unit might be a three seat unit 135. The seat unit template 137 recalls a generalized image of a three seat unit to portray the critical dimensions. For instance, a frontal aspect 139 shows various critical dimensions including seat widths and seat back heights. It is not necessary to have an exact representation of the part designated by a part number 141 extracted from the LOPA as the seating industry has standardized the expression of critical dimensions.

FIG. 6 shows an exemplary completed input spreadsheet 150. Notable information extracted from the LOPA is set forth in a section 151. A section 154 refers the user back to where in a network and under what designation the LOPA in question is stored. For each seat unit designated in the LOPA, a section 157 sets forth the basic geometry of the seats as that geometry had been entered in the seat unit template 137 (FIG. 5). In a section 164, the load geometry of the seating unit is set out. The load geometry defines the lever arm used by the model to define the load exerted on the fasteners.

In the presently preferred embodiment, both the input and the output spreadsheets are filled according to the load structure template 105 (FIG. 4).

While the preferred embodiment of the invention has been illustrated and described, as noted above, many changes can be made without departing from the spirit and scope of the invention. Accordingly, the scope of the invention is not limited by the disclosure of the preferred embodiment.

Instead, the invention should be determined entirely by reference to the claims that follow.

What is claimed is:

1. A method for generating computer-based models of seats on a passenger compartment floor plate from a first document, the method comprising:
   receiving a first document defining a plurality of seat positions and seat identities associated with the seat positions;
   extracting dimensions according to seat identities;
   generating a model of the seats affixed with fasteners to the passenger compartment floor plate based upon the seat positions, the extracted dimensions, and seat identities; and
   simulating loads on the fasteners in accordance with an acceleration of a known magnitude and direction.

2. The method of claim 1, wherein the first document includes a spreadsheet.

3. The method of claim 1, wherein the first document includes an XML document.

4. The method of claim 1, wherein generating of the model includes generating a graphic representation of the model.

5. The method of claim 1, wherein simulating loads includes storing the loads in association with the acceleration.

6. The method of claim 5, wherein storing the loads includes storing the loads in a second document.

7. The method of claim 6, wherein the second document includes a spreadsheet.

8. The method of claim 6, wherein second document includes an XML document.

9. The method of claim 1, wherein the first document includes a LOPA.

10. The method of claim 1, wherein the method includes accessing information stored at an addressable site on a network.

11. A computer program residing on a readable memory medium generating computer-based models of seats on a passenger compartment floor plate from a first document, the computer program comprising:
   a first computer program code for receiving a first document defining a plurality of seat positions and seat identities associated with the seat positions;
   a second computer program code for extracting dimensions according to seat identities;
   a third computer program code for generating a model of the seats affixed with fasteners to the passenger compartment floor plate based upon the seat positions, the extracted dimensions, and seat identities; and
   a fourth computer program code for simulating loads on the fasteners in accordance with an acceleration of a known magnitude and direction.

12. The computer program of claim 11, wherein the first computer program code is configured to receive a spreadsheet.

13. The computer program of claim 11, wherein the first computer program code is configured to receive an XML document.

14. The computer program of claim 11, wherein the third computer program code is configured to generate a graphic representation of the model.

15. The computer program of claim 11, wherein the third computer program code is configured to store loads in association with the acceleration.

16. The computer program of claim 15, wherein the third computer program code stores the loads in a second document.

17. The computer program of claim 16, wherein the second document includes a spreadsheet.

18. The computer program of claim 16, wherein the second document includes an XML document.

19. The computer program of claim 11, wherein the first computer program code is configured to receive a LOPA.

20. The computer program of claim 11, wherein the first computer program code includes means for accessing information stored at an addressable site on a network.

21. A system for generating computer-based models of seats on a passenger compartment floor plate from a first document, the system comprising:
   a first component for receiving a first document defining a plurality of seat positions and seat identities associated with the seat positions;
   a second component for extracting dimensions according to seat identities;
   a third component for generating a model of the seats affixed with fasteners to the passenger compartment floor plate based upon the seat positions, the extracted dimensions, and seat identities; and
   a fourth component for simulating loads on the fasteners in accordance with an acceleration of a known magnitude and direction.

22. The system of claim 21, wherein the first component is configured to receive a spreadsheet.

23. The system of claim 21, wherein the first component is configured to receive an XML document.

24. The system of claim 21, wherein the third component is configured to generate a graphic representation of the model.

25. The system of claim 21, wherein the third component is configured to store loads in association with the acceleration.

26. The system of claim 25, wherein the third component stores the loads in a second document.

27. The system of claim 26, wherein the second document includes a spreadsheet.

28. The system of claim 26, wherein the second document includes an XML document.

29. The system of claim 21, wherein the first component is configured to receive a LOPA.

30. The system of claim 21, wherein the first component is configured to access information stored at an addressable site on a network.

* * * * *